Nov. 25, 1958 — T. R. POWERS — 2,861,292
POULTRY PROCESSING APPARATUS
Filed April 30, 1956

INVENTOR.
THEODORE R. POWERS
BY M. A. Hobbs
ATTORNEY

United States Patent Office 2,861,292
Patented Nov. 25, 1958

2,861,292

POULTRY PROCESSING APPARATUS

Theodore R. Powers, Culver, Ind.

Application April 30, 1956, Serial No. 581,502

4 Claims. (Cl. 17—11)

The present invention relates to a poultry processing apparatus and more particularly to an apparatus for use in performing the first step of a poultry dressing operation.

One of the principal objects of the present invention is to provide a poultry processing apparatus which holds the birds in a confined position during the killing and bleeding step to prevent any substantial contamination of the feathers with blood and which can be kept clean and free of residual blood throughout the operation of the apparatus.

Another object of the invention is to provide an easily cleaned and serviced apparatus for holding poultry during the killing and bleeding steps of the dressing operation, which can readily be inspected at any time during the operation for sanitation.

Still another object of the invention is to provide a relatively simple, easily operated apparatus for use in the poultry dressing operation, which restricts the movement of the birds during killing and bleeding and simultaneously conveys them to and automatically discharges them at the next station in the operation.

A further object of the invention is to provide a continuously operated poultry dressing apparatus which accelerates the poultry killing and bleeding steps of a poultry dressing operation and which can be operated without any special knowledge or skill.

Additional objects and advantages of the present invention will become apparent from the following description and accompanying drawings, wherein.

Figure 1:
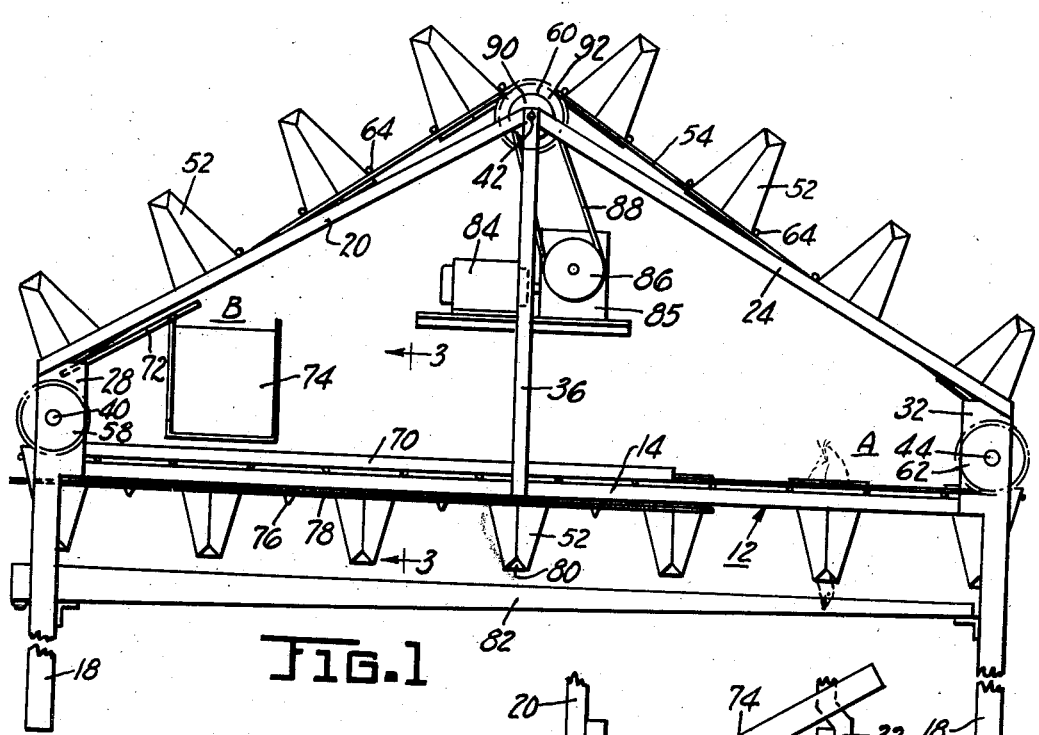
Figure 1 is a front elevational view of my poultry processing apparatus wherein a bird is shown in dotted lines held ready for killing and bleeding.
Figure 2:
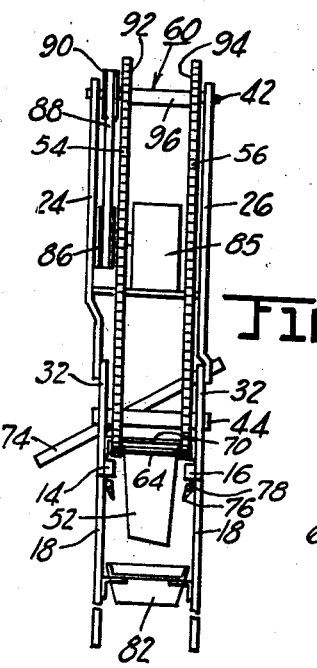
Figure 2 is a side elevational view of my apparatus with a portion of the bird retaining device removed to show more effectively the driving mechanism.
Figure 3:
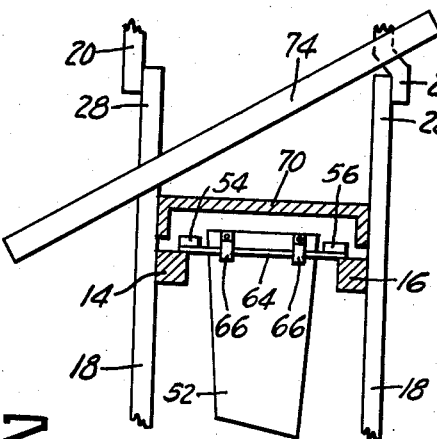
Figure 3 is an enlarged cross sectional view of my apparatus taken on line 3—3 of Figure 1.
Figure 4:
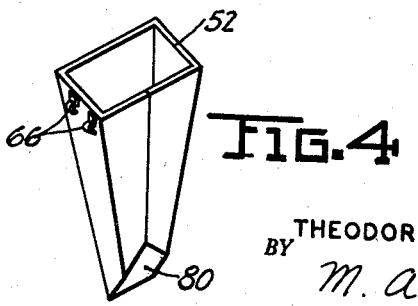
Figure 4 is an enlarged perspective view of one of the poultry retaining devices forming a part of my apparatus.

Referring more specifically to the drawings, my apparatus includes a frame 12 having two substantially identical vertical sections forming the two sides and consisting of two parallel, horizontal base members 14 and 16 mounted on legs 18 at the ends of said members and two sets of angular members 20 and 22 of one set and 24 and 26 of the other set. Each set of angular members is connected to and supported on base members 14 and 16 by upright supports 28 for angular members 20 and 22 and supports 32 for angular members 24 and 26. Vertically disposed members 36 secured to horizontal base members 14 and 16 hold the members of the frame rigidly in place relative to one another as shown in Figure 1. The two side sections of the frame are substantially triangular in shape and are retained in spaced relation by shafts 40, 42 and 44 secured at each end to the frame sections. While the frame is shown supported by legs 18, the entire apparatus may be formed as an integral part of a large processing unit in which it is mounted or it may be suspended from an overhead beam.

Mounted on frame 12 is an endless conveyor having a plurality of funnel shaped bird retainers 52 disposed between and equally spaced along chains 54 and 56 which move in unison over sprocket assemblies 58, 60 and 62. Retainers 52 are supported between the chains by transverse rods 64 welded or otherwise secured at their ends to chains 54 and 56 and are attached to said rods by ears 66 joined to opposite sides of the retainers and formed around the rods 64. The retainer 52 can readily be detached from the rods by merely lifting one end of each ear and slipping the retainer away from said rods. This retainer mounting construction holds said retainers in a fixed position relative to chains 54 and 56 so that, as the chains move through their path over and between the three sprocket assemblies 58, 60, and 62, the small ends of the retainers are at all times extending outwardly from the frame. As chains 54 and 56 move from right to left at their lowermost position, the ends of rods 64 attached to the chains ride on the upper surface of horizontal base members 14 and 16 and are thus firmly supported while carrying the birds during the killing and bleeding operations of the dressing process.

The birds are inserted in the funnels at the right hand end of the horizontal member at the station indicated by the letter A and are immediately killed and then carried by the conveyor chains along with and parallel to the horizontal members at a rate sufficiently slow to permit the blood to drain thoroughly from the birds and the period of reflex action to pass. In order to hold the birds firmly in the funnels during the period of reflex action, a cover 70 is disposed above base members 14 and 16 in close proximity thereto so that when the birds move along the base members in the funnels and are drawn under cover 70 they are pressed downwardly in the funnel sufficiently to prevent any substantial movement. Cover 70 is supported in a fixed position above the base member by upright supports 32 and members 36. The birds are carried by the conveyor around sprocket assembly 58 and upwardly along angular members 20 and 22 and are held in the funnels as they move along this upward course by a plate 72 until they reach the discharge station B. At this point the birds fall from the inverted funnels and drop onto a chute 74 beneath station B and are carried by said chute to the next succeeding station in the poultry dressing operation. The funnels are moved away from station B, over sprockets 60 and 62 and are returned to station A for refilling.

After the birds have been killed by the operator at or near station A and are moving to the left as shown in Figure 1 the funnels and necks of the birds are continually sprayed with streams of water from a plurality of nozzles 76 disposed in water supply pipe 78 mounted on the frame adjacent the underside of base members 14. In order to facilitate the washing of the blood from the funnels and the necks of the birds, the funnels are provided with a slot 80 extending longitudinally from the small end of the funnel. The water and blood drip into a trough 82 extending parallel to the conveyor for the full length of the base members 14 and 16. As the funnels move downwardly along angular members 20 and 22, they can be readily and thoroughly inspected for sanitation and condition by the operator who stands in the proximity of station A.

The two chains 54 and 56 are driven by an electrical motor 84 through a speed reducing mechanism 85, preferably of the variable type, through pulley 86, belt 88, pully 90 and through the respective sprockets of sprocket assembly 60 rotatably mounted on shaft 42. The sprocket assembly consists of two spaced sprockets 92 and 94 mounted on or connected by a hollow shaft 96 through which shaft 42 extends, said sprockets and hollow shaft forming an integral unit which is driven directly and positively from pully 90. Shaft 42 which is non-rotating is secured at each end to frame 12. Sprocket assemblies 58 and 62 are similar in construction to assembly 60 and are adapted to rotate freely on stationary shafts 40 and 44, respectively. Since unison movement of chains 54 and 56 is obtained by sprocket assembly 60 the two sprockets of assemblies 58 and 62 can if desired be independently mounted on shafts 40 and 44.

In the operation of my apparatus just described, motor 84 is started and the valve (not shown) controlling water supply pipe 78 is opened to start the flow of water from nozzles 76 onto bird retainers 52 as they move in their horizontal path along base members 14 and 16. The conveyor chains 54 and 56 are driven by the motor in a clockwise direction, as viewed in Figure 1, moving funnels successively from station A along the base members 14 and 16 and then upwardly along angular members 20 and 22 to station B. As the apparatus is operating in the foregoing manner, the operator places the birds in retainer 52 with their heads and a portion of their necks extending beyond the lower or small end of the retainer. The bird is then immediately decapitated and the blood is drained from the body into trough 82 as the bird is carried by the conveyor from station A along the base members. The conveyor is regulated to travel at such a rate that the blood will be well drained from the bird by the time it reaches the left hand end of the apparatus and starts around sprocket assembly 58. While the bird is traveling from station A to the left hand end it and the retainer 52 in which it is held are constantly being washed of blood by water from nozzles 76. After decapitation of the bird movement resulting from the reflex action is restricted first by the retainer 52 alone and then by the retainer in conjunction with cover 70. On passing around sprocket 58, the bird moves upwards along angular members 20 and 22 held in the retainer by plate 72 until station B is reached. At this point the bird no longer being held in the retainer by the plate drops from the retainer and falls onto chute 74 which then delivers the bird to the next succeeding station in the poultry dressing operation. The empty retainers are carried by chains 52 and 54 over sprocket assembly 60, downwardly along angular members 24 and 26 where the retainers are inspected by the operator, and thence around sprocket assembly 62 and back to station A for refilling.

One of the particular advantages of the present apparatus is that the retainers 52 are in their lowermost position throughout the time the blood is being drained from the birds and the streams of water from nozzles 76 are constantly washing the blood downwardly and away from the birds and from both the full and empty retainers 52. This arrangement provides maximum sanitation of the apparatus and the birds being handled by the apparatus, in that at no time is the blood or the water used in washing the birds and retainers directed toward or permitted to drain on other birds and/or retainers.

Various changes and modifications may be made in the foregoing apparatus to suit requirements without departing from the present invention. For example, by increasing the length of the apparatus, i. e. increasing the length of the base member and also the number of retainers 52 along said members the capacity of the apparatus and rate of operation can be increased proportionately. Further, a single broad belt or a plurality of belts may be substituted for chains 54 and 56.

I claim:

1. A poultry processing apparatus, comprising a frame, a first set of coaxial sprockets supported on horizontal axes on said frame, a second set of coaxial sprockets supported on a horizontal axis on said frame and spaced from said first set, the bottom of said sets of sprockets being on substantially common horizontal planes, an endless chain mounted on the corresponding sprocket of each set, an endless chain mounted on the other corresponding sprockets of each set and being spaced from said first mentioned chain, said chains moving in vertical parallel planes, a plurality of spaced funnel shaped bird retainers mounted between and fixedly attached to said chains and extending perpendicularly thereto and outwardly therefrom, with their large ends adjacent the chains, said retainers traveling between the bottoms of said sprocket sets with their large ends up and between the tops of said sprockets with their large ends down, a cover mounted between said first and second sets of sprockets and spaced a substantial distance from said first sprocket set over which the chains pass before passing under said cover, thereby providing a station for inserting the birds in the retainers, a pipe extending parallel with said chains adjacent said cover, a series of nozzles connected to said pipe below said cover for spraying water on said retainers as they move beneath said cover, a trough below said chains and beneath said retainers for catching blood from the birds as they are carried by the retainers under said cover, a plate mounted between said first and second sets of sprockets and above said cover for holding the birds in said retainers during a portion of the distance through which the retainers travel with their large ends down, said plate being spaced from said first set of sprockets, and a chute mounted on said frame at said plate end farthest from said second set of sprockets for receiving the birds as they fall from said inverted retainers moving beyond the end of said plate.

2. A poultry processing apparatus, comprising a frame, a first set of coaxial sprockets supported on horizontal axes on said frame, a second set of coaxial sprockets supported on a horizontal axis on said frame and spaced from said first set, an endless chain mounted on the corresponding sprocket of each set, an endless chain mounted on the other corresponding sprockets of each set and being spaced from said first mentioned chain, said chains moving in vertical parallel planes, a plurality of funnel shaped bird retainers mounted between and fixedly attached to said chains and extending perpendicularly thereto and outwardly therefrom, said retainers traveling between the bottoms of said sprocket sets with their large ends up and between the tops of said sprockets with their large ends down, a cover mounted between said first and second sets of sprockets and spaced a substantial distance from said first sprocket set over which the chains pass before passing under said cover, thereby providing a station for inserting the bird in the retainers, a plate mounted between said spaced sets of sprockets and above said cover for holding the birds in said retainers during a portion of the distance through which the retainers travel with their large ends down, said plate being spaced from said first set of sprockets, and a chute mounted on said frame at said plate end farthest from said second set of sprockets for receiving the birds as they fall from said inverted retainers moving beyond the end of said plate.

3. A poultry processing apparatus, comprising a frame, a first set of coaxial sprockets supported on horizontal axes on said frame, a second set of coaxial sprockets supported on a horizontal axis on said frame and spaced from said first set, an endless chain mounted on the corresponding sprocket of each set, an endless chain mounted on the other corresponding sprockets of each set and being spaced from said first mentioned chain, a plurality of funnel shaped bird retainers mounted between and fixedly attached to said chains and extending perpendicularly thereto and outwardly therefrom, said retainers traveling between the bottoms of said sprocket sets with their large ends up and between the tops of said sprockets with their large ends down, and a conveyor member extending between said sprocket sets for receiving birds as they fall from the retainers traveling with their large ends down.

4. A poultry processing apparatus, comprising a frame, a first and second rotatable means mounted on said frame with the axes thereof parallel to each other and on a substantially horizontal plane, an endless conveyor mounted around said rotatable means, a plurality of spaced funnel shaped bird retainers fixedly mounted on said conveyor and extending perpendicularly thereto and outwardly therefrom with their small ends being outwardly away from the conveyor, said retainers traveling between the bottoms of said rotatable means with their large ends up and between the tops of said rotatable means with their large ends down, a cover between said rotatable means in close proximity to the conveyor section between the bottoms of said rotatable means, and a conveyor member extending between said rotatable means for receiving birds as they fall from the retainer traveling with their large ends down.

References Cited in the file of this patent
UNITED STATES PATENTS

| | | |
|---|---|---|
| 237,501 | Dodge | Feb. 8, 1881 |
| 2,570,143 | Merrick | Oct. 2, 1951 |